(12) United States Patent
Kurakawa et al.

(10) Patent No.: US 11,001,335 B2
(45) Date of Patent: May 11, 2021

(54) SWING ARM FOR SADDLE RIDING VEHICLE

(71) Applicant: HONDA MOTOR CO., LTD., Tokyo (JP)

(72) Inventors: Yukinori Kurakawa, Asaka (JP); Yusuke Ueki, Asaka (JP); Yuji Ishitsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 16/200,925

(22) Filed: Nov. 27, 2018

(65) Prior Publication Data

US 2019/0176928 A1 Jun. 13, 2019

(30) Foreign Application Priority Data

Dec. 7, 2017 (JP) .............................. JP2017-235102

(51) Int. Cl.
*B62K 25/28* (2006.01)
*B62M 7/02* (2006.01)
*B62M 9/16* (2006.01)

(52) U.S. Cl.
CPC ............ *B62K 25/28* (2013.01); *B62K 25/283* (2013.01); *B62M 7/02* (2013.01); *B62M 9/16* (2013.01)

(58) Field of Classification Search
CPC .... B62M 2009/007; B62M 7/02; B62M 9/16; B62K 25/283; B62K 25/28; B62K 19/44
See application file for complete search history.

(56) References Cited

U.S. PATENT DOCUMENTS

| | | | |
|---|---|---|---|
| 4,540,193 A * | 9/1985 | Noda ................... | B62K 25/286 180/219 |
| 5,966,813 A * | 10/1999 | Durand ................ | B23K 13/025 29/897.2 |
| 6,182,994 B1 * | 2/2001 | Gogo ................... | B62K 25/283 180/227 |

(Continued)

FOREIGN PATENT DOCUMENTS

EP    3366562 A1 *  8/2018  ............. B62K 25/26
JP    S60-107471 A   6/1985

(Continued)

OTHER PUBLICATIONS

Yotaro, Mori (JP 2011093410) "Swing Arm Structure of Saddle Riding Type Vehicle" (Description, English Translation) May 12, 2011 (Year: 2011).*

(Continued)

*Primary Examiner* — Ruth Ilan
*Assistant Examiner* — Myles A Harris
(74) *Attorney, Agent, or Firm* — Rankin, Hill & Clark LLP

(57) ABSTRACT

A swing arm for a saddle riding vehicle which includes a pivot section connected to a vehicle body, and a wheel support section configured to support a rear wheel and which is capable of swinging around the pivot section, includes a swing arm main body made of a fiber reinforced resin, in which the swing arm main body includes a pivot-side opening configured to open an end on a side of the pivot section, and a rear end opening configured to open an end on a side of the wheel support section, and is formed in a hollow shape continuous from the pivot-side opening to the rear end opening.

4 Claims, 8 Drawing Sheets

(56) References Cited

U.S. PATENT DOCUMENTS

| | | | | |
|---|---|---|---|---|
| 6,450,282 | B1* | 9/2002 | Gogo | B62K 25/283 |
| | | | | 180/219 |
| 7,165,301 | B2* | 1/2007 | Miyashiro | B62K 25/283 |
| | | | | 29/421.1 |
| 7,703,787 | B2* | 4/2010 | Kawamura | B62K 25/283 |
| | | | | 280/284 |
| 2004/0016583 | A1* | 1/2004 | Pyykonen | B62M 27/02 |
| | | | | 180/193 |
| 2006/0290094 | A1* | 12/2006 | Kamalian | B62K 19/16 |
| | | | | 280/274 |
| 2020/0269947 | A1* | 8/2020 | Seger | B62K 25/286 |

FOREIGN PATENT DOCUMENTS

| | | | | |
|---|---|---|---|---|
| JP | H08-99364 | | 4/1996 | |
| JP | 2011-093410 A | | 5/2011 | |
| JP | 2012166764 A | * | 9/2012 | B62K 11/10 |
| JP | 2015-137066 | | 7/2015 | |
| WO | WO-2017042885 A1 | * | 3/2017 | B62K 11/10 |

OTHER PUBLICATIONS

Okada (JP 2012166764) English Language Machine Translation printed on Sep. 22, 2020 (Year: 2012).*
Minami (WO-2017042885-A1) (Description, English Machine Translation) Mar. 2017 (Year: 2017).*
Japanese Office Action with English Translation dated Jun. 25, 2019, 11 pages.

* cited by examiner

SWING ARM FOR SADDLE RIDING VEHICLE

INCORPORATION BY REFERENCE

The present application claims priority under 35 U.S.C. § 119 to Japanese Patent Application No. 2017-235102 filed on Dec. 7, 2017. The content of the application is incorporated herein by reference in its entirety.

TECHNICAL FIELD

The present invention relates to a swing arm for a saddle riding vehicle.

BACKGROUND ART

Hitherto, in a swing arm for a saddle riding vehicle, there has been known one that is formed in a hollow shape by press-forming (see, for example, Patent Document 1).

In addition, from the viewpoint of lightening in weight and enhancing rigidity, it has been known to configure a tubular structural part (propeller shaft) from a fiber reinforced resin (see, for example, Patent Document 2).

PRIOR ART DOCUMENT

Patent Documents

[Patent Document 1]
Japanese Patent Laid-Open No. 2015-137066
[Patent Document 2]
Japanese Patent Laid-Open No. Hei 8-99364

SUMMARY OF THE INVENTION

Problem to be Solved by the Invention

Meanwhile, it may be contemplated to configure the above-mentioned conventional swing arm from a fiber reinforced resin. For example, a hollow swing arm formed from a fiber reinforced resin can be manufactured by joining a plurality of split bodies. In this case, however, since fibers of the fiber reinforced resin are divided at the joint part between the split bodies, rigidity of the swing arm is liable to be lowered.

The present invention has been made in consideration of the above-mentioned circumstances. Accordingly, it is an object of the present invention to provide a hollow swing arm which is high in rigidity.

Means for Solving the Problem

According to an aspect of the present invention, there is provided a swing arm for a saddle riding vehicle which includes a pivot section (20) connected to a vehicle body (F), and a wheel support section (21) configured to support a wheel (3), and which is capable of swinging around the pivot section (20). The swing arm includes a swing arm main body (25) made of a fiber reinforced resin. The swing arm main body (25) includes a pivot-side opening (40) configured to open an end on a side of the pivot section (20), and a wheel-side opening (34, 38) configured to open an end on a side of the wheel support section (21), and is formed in a hollow shape continuous from the pivot-side opening (40) to the wheel-side opening (34, 38).

In addition, in the above-mentioned aspect of the invention, the pivot section (20) may include a pair of metal-made pivot members (26L, 26R) provided at left and right portions of the swing arm main body (25), and a fiber reinforced resin-made center member (27) interposed between the left and right pivot members (26L, 26R).

Besides, in the above-mentioned aspect of the invention, contact surfaces (65, 66) between the pivot members (26L, 26R) and the center member (27) may be surfaces perpendicular to an axis (20a) of the pivot section (20).

Further, in the above-mentioned aspect of the invention, the center member (27) may be laid on and joined to the swing arm main body (25), and an outer edge (51a, 52a) of the center member (27) may be provided with a recess (53, 54) in a central portion in a transverse direction of the vehicle.

In addition, in the above-mentioned aspect of the invention, the pivot members (26L, 26R) may be provided with a chain slider mounting section (59) to which a chain slider (29) is mounted.

Besides, in the above-mentioned aspect of the invention, the pivot members (26L, 26R) and the center member (27) may close the pivot-side opening (40).

Effects of the Invention

The swing arm for a saddle riding vehicle according to an aspect of the present invention includes the pivot section connected to the vehicle body, and the wheel support section configured to support the wheel, is capable of swinging around the pivot section, and includes the swing arm main body made of a fiber reinforced resin. The swing arm main body includes the pivot-side opening configured to open the end on the pivot section side, and the wheel-side opening configured to open the end on the wheel support section side, and is formed in a hollow shape which is continuous from the pivot-side opening to the wheel-side opening.

This configuration ensures that since the swing arm main body is in a hollow shape continuous from the pivot-side opening to the wheel-side openings, a pressure can be exerted from the inside of the fiber reinforced resin-made swing arm main body, and the swing arm main body can be formed into a hollow shape by the pressure. Therefore, the continuity of fibers of the fiber reinforced resin can be maintained over a wide range of the swing arm main body. Accordingly, a hollow swing arm high in rigidity can be provided.

In addition, in the above-mentioned aspect of the invention, the pivot section may include the pair of metal-made pivot members provided at left and right portions of the swing arm main body, and the fiber reinforced resin-made center member interposed between the left and right pivot members. This configuration enables the pivot section to be lighter in weight due to the fiber reinforced resin-made center member. In addition, the pivot member can be positioned by the center member interposed between the left and right pivot members.

Besides, in the above-mentioned aspect of the invention, the contact surfaces of the pivot members and the center member may be surfaces perpendicular to the axis of the pivot section. This configuration makes it possible to abut the pivot members straight on the center member, and thereby to position the pivot members highly accurately.

Further, in the above-mentioned aspect of the invention, the center member may be laid on and joined to the swing arm main body, and the outer edge of the center member may be provided with the recess in a central portion in the transverse direction of the vehicle. According to this configuration, stresses from the pivot member sides can be appropriately received by both end portions of the center member in the transverse direction of the vehicle, and the volume of the center member can be reduced by providing the outer edge of the center member with the recess in the central portion in the transverse direction of the vehicle. Therefore, the center member can be lightened in weight.

In addition, in the above-mentioned aspect of the invention, the pivot members may be provided with the chain slider mounting section to which the chain slider is mounted. This configuration ensures that since the metal-made pivot members are provided with the chain slider mounting section, it is unnecessary to break the continuity of fibers of the fiber reinforced resin for the purpose of providing the chain slider mounting section. Therefore, the rigidity of the swing arm can be enhanced.

Besides, in the above-mentioned aspect of the invention, the pivot members and the center member may close the pivot-side opening. This configuration enables the pivot-side opening to be closed with a simple structure.

MODE FOR CARRYING OUT THE INVENTION

Figure 1:
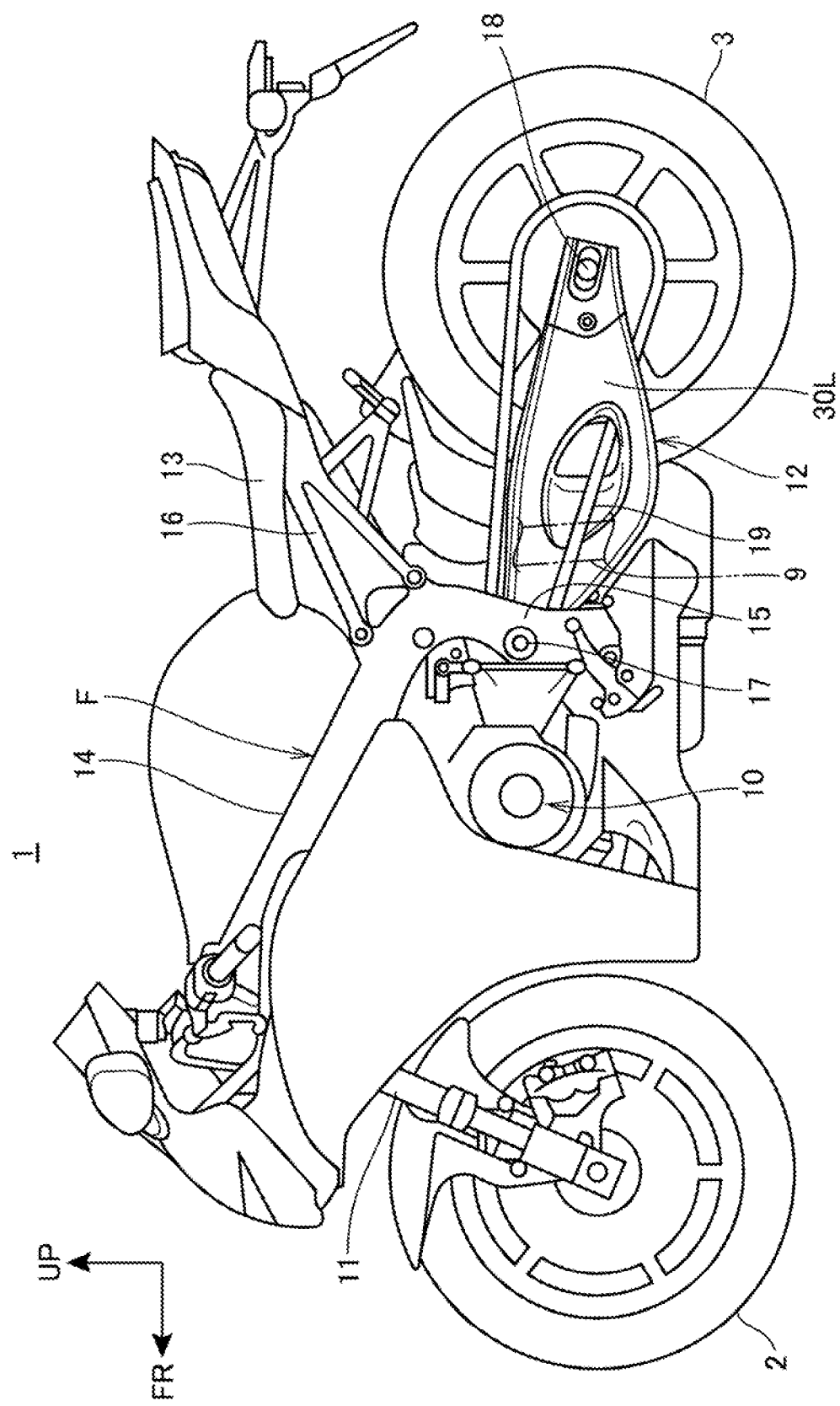
FIG. 1 is a left side view of a motorcycle according to an embodiment of the present invention.

An embodiment of the present invention will be described below, referring to the drawings. Note in the following description that, the directions or sides such as front, rear, left, right, upper and lower sides will be the same as those with reference to the vehicle body, unless otherwise specified. In addition, reference symbol FR in each drawing indicates the vehicle body front side, reference symbol UP indicates the vehicle body upper side, and reference symbol LH indicates the vehicle body left-hand side. Besides, in the drawings, the vehicle body right-hand side may be indicated by reference symbol RH.

FIG. 1 is a left side view of a motorcycle according to an embodiment of the present invention.

The motorcycle 1 is a vehicle in which an engine 10 as a power unit is supported on a body frame F (vehicle body), a steering system 11 supporting a front wheel 2 in a steerable manner is steerably supported on a front end of the body frame F, and a swing arm 12 supporting a rear wheel 3 (wheel) is provided on a rear side of the body frame F. The motorcycle 1 is a saddle riding vehicle in which a seat 13 on which a driver is seated in a straddling manner is provided on an upper side of a rear portion of the body frame F.

The body frame F includes a head pipe (not depicted) that supports the steering system 11, a pair of left and right main frames 14 extending rearwardly downward from the head pipe, a pair of left and right pivot frames 15 extending downward from rear end portions of the main frames 14, and a seat frame 16 extending rearward from the rear end portions of the main frames 14.

The motorcycle 1 has a pivot shaft 17 that connects the left and right pivot frames 15 in the transverse direction of the vehicle (left-right direction). The pivot shaft 17 extends in the transverse direction of the vehicle.

A front end of the swing arm 12 is pivotally supported by the pivot shaft 17. The swing arm 12 is capable of swinging upward and downward, with the pivot shaft 17 as a center. The swing arm 12 is connected to the body frame F through a tubular rear cushion unit 9.

The rear wheel 3 is rotatably supported by an axle 18 provided at a rear end portion of the swing arm 12.

The engine 10 is disposed on the lower side of the main frames 14 and on the front side of the pivot frames 15. An output of the engine 10 is transmitted to the rear wheel 3 by a drive chain 19 arranged between an output shaft (not depicted) of the engine 10 and the rear wheel 3.

Figure 2:
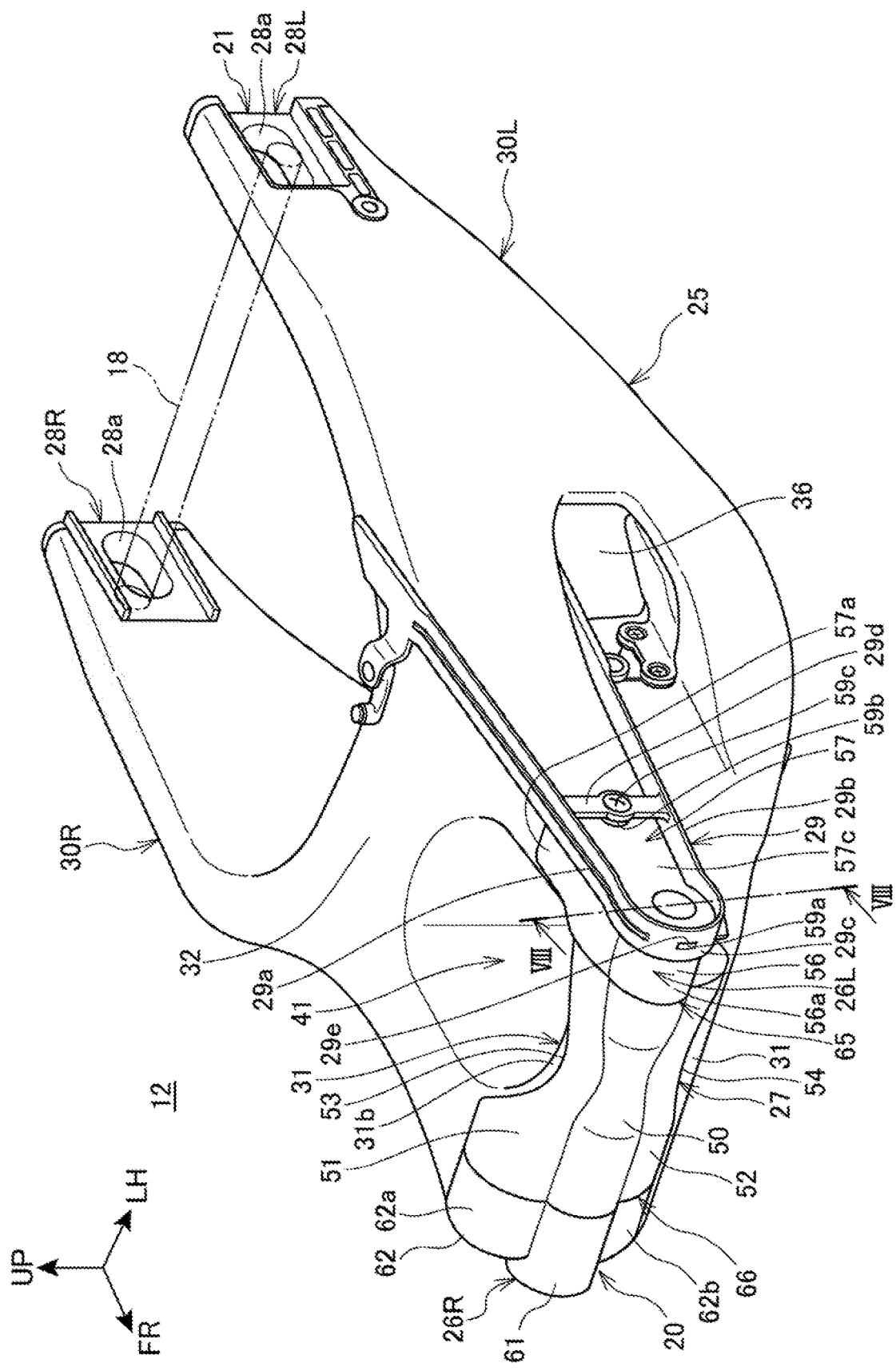
FIG. 2 is a perspective view of a swing arm, as viewed from a left front side.

FIG. 2 is a perspective view of the swing arm 12, as viewed from a left front side.

The swing arm 12 is provided at a front end portion thereof with a pivot section 20 pivotally supported by the pivot shaft 17 (FIG. 1), and is provided at a rear end portion thereof with a wheel support section 21 that supports the rear wheel 3 through the axle 18.

Figure 3:
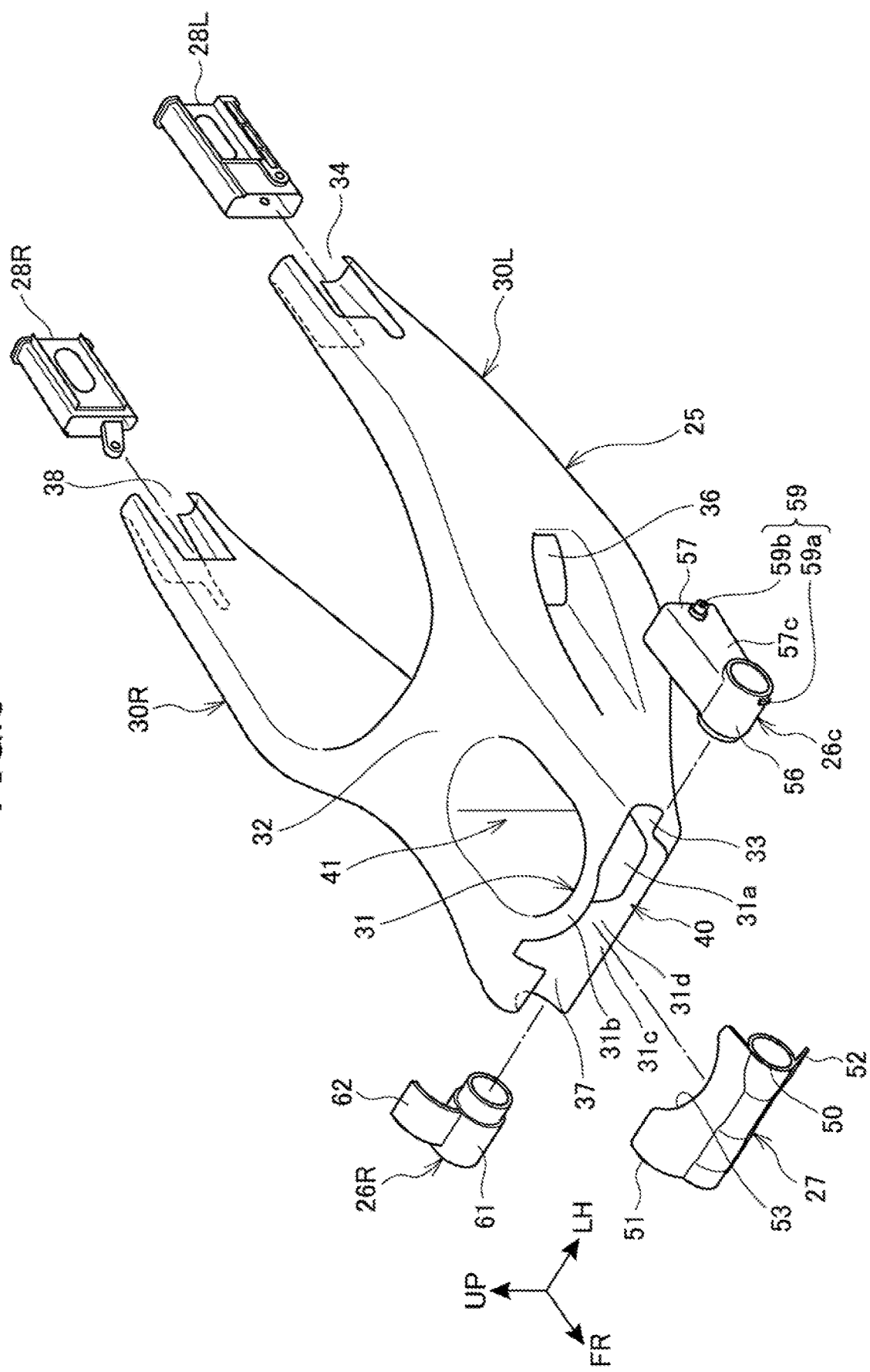
FIG. 3 is an exploded perspective view of the swing arm.

FIG. 3 is an exploded perspective view of the swing arm 12.

As illustrated in FIGS. 2 and 3, the swing arm 12 includes a swing arm main body 25 extending in an arm form from the pivot shaft 17 side toward the rear wheel 3 side, a pair of pivot members 26L and 26R connected to left and right side portions of a front end portion of the swing arm main body 25, and a center member 27 interposed between the pivot members 26L and 26R.

In addition, the swing arm 12 includes a pair of left and right end pieces 28L and 28R connected to rear end portions of the swing arm main body 25.

Further, a chain slider 29 that guides the drive chain 19 (FIG. 1) is mounted to the swing arm 12.

The swing arm main body 25 is formed in a box shape having a space in the inside thereof, and whole of the part forming the box-shaped outer shell is formed of a fiber reinforced resin.

The fiber reinforced resin constituting the swing arm main body 25 is, for example, CFRP (carbon fiber reinforced plastic). The CFRP is a composite material composed of a matrix resin and reinforcement carbon fiber, and is formed, for example, by impregnating a cloth woven from warp and weft, which are composed of bundles of carbon fibers, with a matrix resin, and heating and curing the resulting material. While a thermosetting resin, for example, is used as the matrix resin, a thermoplastic resin may also be used.

Note that as the fiber reinforced resin, not only the CFRP but also other FRPs (fiber reinforced plastics) using other kinds of fibers may be used.

The swing arm main body 25 integrally includes: a one-side arm section 30L located on one of left and right sides of the rear wheel 3; an other-side arm section 30R located on the other of the left and right sides of the rear wheel 3; a front end connection section 31 connecting a front end portion of the one-side arm section 30L and a front end portion of the other-side arm section 30R in the transverse direction of the vehicle (left-right direction); and an intermediate connection section 32 connecting the one-side arm section 30L and the other-side arm section 30R in the transverse direction of the vehicle on the rear side of the front end connection section 31.

The one-side arm section 30L is in a tubular form which is formed to be hollow from a front end opening 33 at a front end to a rear end opening 34 (wheel-side opening) at a rear end. The one-side arm section 30L is larger in size in the vertical direction than in the transverse direction of the vehicle, over the whole length thereof.

The one-side arm section 30L is provided, at an intermediate portion thereof in the longitudinal direction of the vehicle, with a chain passing hole 36 which penetrates the one-side arm section 30L in the longitudinal direction of the vehicle and in the transverse direction of the vehicle. A lower portion of the drive chain 19 is passed through the chain passing hole 36.

The other-side arm section 30R is in a tubular form which is formed to be hollow from a front end opening 37 at a front end to a rear end opening 38 (wheel-side opening) at a rear end. The other-side arm section 30R is larger in size in the vertical direction than in the transverse direction of the vehicle, over the whole length thereof.

The wheel support section 21 is provided at a rear end portion of the one-side arm section 30L and a rear end portion of the other-side arm section 30R.

The intermediate connection section 32 is formed in a hollow shape through which the inside of the one-side arm section 30L and the inside of the other-side arm section 30R communicate with each other in the transverse direction of the vehicle.

The front end connection section 31 includes: a connection section rear wall 31a connecting the one-side arm section 30L and the other-side arm section 30R in the transverse direction of the vehicle; a connection section upper wall 31b extending forward from an upper edge of the connection section rear wall 31a; and a connection section lower wall 31c extending forward from a lower edge of the connection section rear wall 31a. In addition, the front end connection section 31 has a connection section opening 31d which is partitioned by the connection section upper wall 31b and the connection section lower wall 31c and is opened to the front side.

The connection section upper wall 31b is curved forwardly downward, and extends forwardly downward. The connection section lower wall 31c is curved forwardly upward, and extends forwardly upward.

The swing arm main body 25 is provided in a front surface thereof with a pivot-side opening 40 through which the inside of the swing arm main body 25 communicates with the front side. The pivot-side opening 40 includes the front end opening 33 of the one-side arm section 30L, the front end opening 37 of the other-side arm section 30R, and the connection section opening 31d of the front end connection section 31.

The pivot-side opening 40 is opening continuously from one end to the other end of the front surface of the swing arm main body 25 in the transverse direction of the vehicle.

Besides, the swing arm main body 25 is provided with a vertical communication hole 41 penetrating vertically a front portion of the swing arm main body 25. The vertical communication hole 41 is partitioned by inside surfaces of front portions of the one-side arm section 30L and the other-side arm section 30R, a front surface of the intermediate connection section 32, and the connection section rear wall 31a.

The pivot members 26L and 26R, the center member 27, and the end pieces 28L and 28R are formed separately from the swing arm main body 25, and are connected to the swing arm main body 25.

Figure 4:
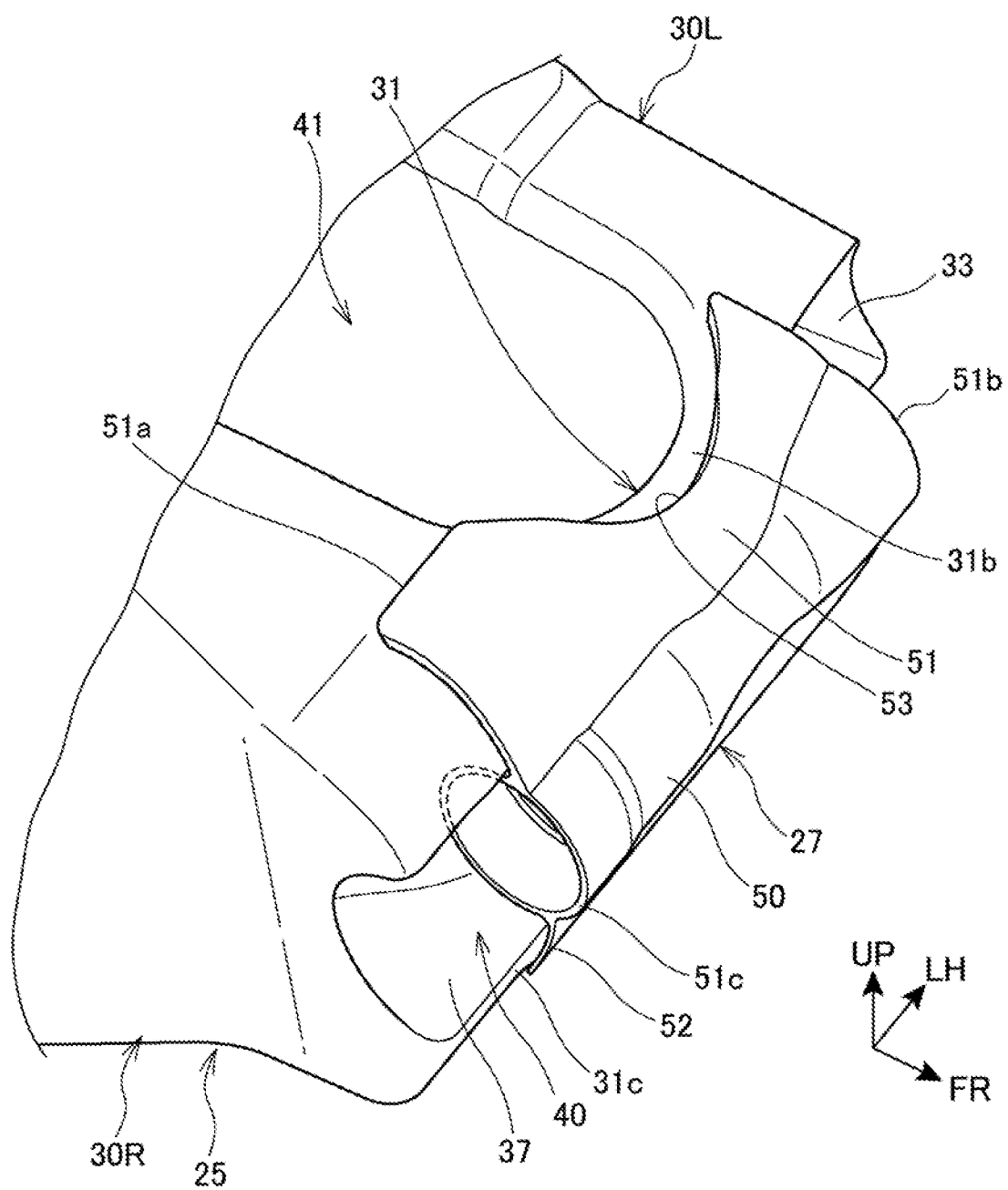
FIG. 4 is a perspective view of a connected state of a center member to a swing arm main body, as viewed from a right upper side.
Figure 5:
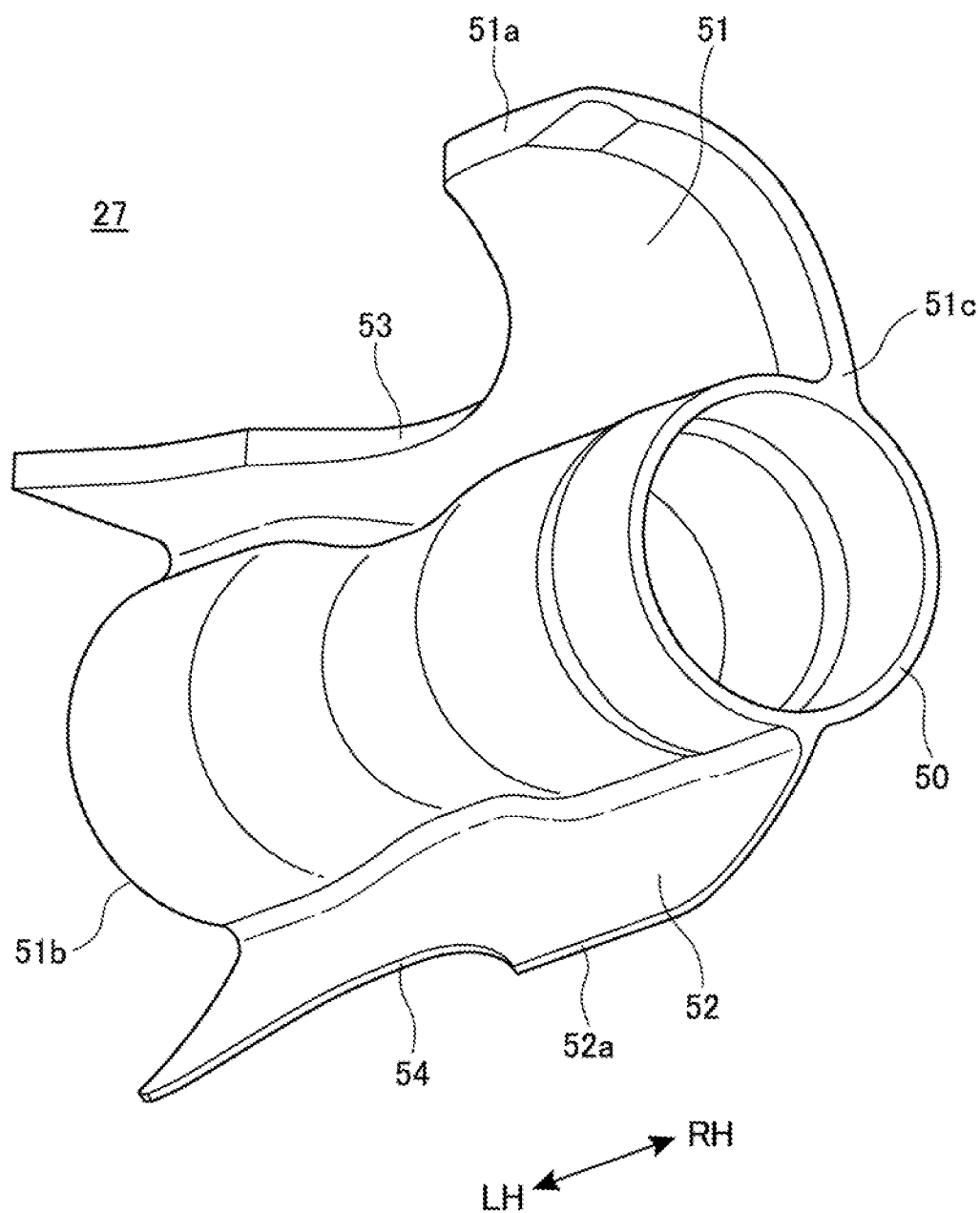
FIG. 5 is a perspective view of the center member, as viewed from a rear side.

FIG. 4 is a perspective view of a connected state of the center member 27 to the swing arm main body 25, as viewed from a right upper side. FIG. 5 is a perspective view of the center member 27, as viewed from a rear side. Here, in FIG. 4, the pivot members 26L and 26R are not depicted.

Referring to FIGS. 2 to 5, the center member 27 integrally includes a cylindrical tubular section 50, an upward extension section 51 extending upward from the tubular section 50, and a downward extension section 52 extending downward from the tubular section 50.

The material constituting the center member 27 is the same fiber reinforced resin as the material of the swing arm main body 25.

The upward extension section 51 of the center member 27 is formed in a plate shape extending rearwardly upward from an upper surface of the tubular section 50. The upward extension section 51 is formed over substantially the whole length of the tubular section 50. The upward extension section 51 is curved along the connection section upper wall 31b of the swing arm main body 25.

The upward extension section 51 is provided, at a central portion of an upper edge 51a (outer edge) thereof in the transverse direction of the vehicle, with an arcuate upperside recess 53 (recess) where the upper edge 51a is recessed to the front side.

The downward extension section 52 of the center member 27 is formed in a plate shape extending rearwardly downward from a lower surface of the tubular section 50. The downward extension section 52 is formed over substantially the whole length of the tubular section 50. The downward extension section 52 is curved along the connection section lower wall 31c of the swing arm main body 25.

The downward extension section 52 is provided, at a central portion of a lower edge 52a (outer edge) thereof in the transverse direction of the vehicle, with an arcuate lower-side recess 54 (recess) where the lower edge 52a is recessed to the front side.

Both end faces 51b and 51c of the center member 27 in the transverse direction of the vehicle extend rectilinearly in the direction substantially orthogonal to the pivot shaft 17 (FIG. 1).

The center member 27 is connected to the swing arm main body 25, by fixing the upward extension section 51 and the downward extension section 52 to the front end connection section 31.

More specifically, the upward extension section 51 is laid on the connection section upper wall 31b of the front end connection section 31 from above, and is adhered to the connection section upper wall 31b with an adhesive.

In addition, the downward extension section 52 is laid on the connection section lower wall 31c of the front end connection section 31 from below, and is adhered to the connection section lower wall 31c with an adhesive. Here, the center member 27 and the swing arm main body 25 are formed from the same fiber reinforced resin. Therefore, the center member 27 can be bonded more firmly with an adhesive, as compared to the case where the center member 27 is adhered to other fiber reinforced resin with a matrix resin different from that for the center member 27 or to a metallic material.

The tubular section 50 extends in the transverse direction of the vehicle within the connection section opening 31d between the connection section upper wall 31b and the connection section lower wall 31c.

The connection section opening 31d of the swing arm main body 25 is closed with the center member 27 from the front side.

Figure 6:
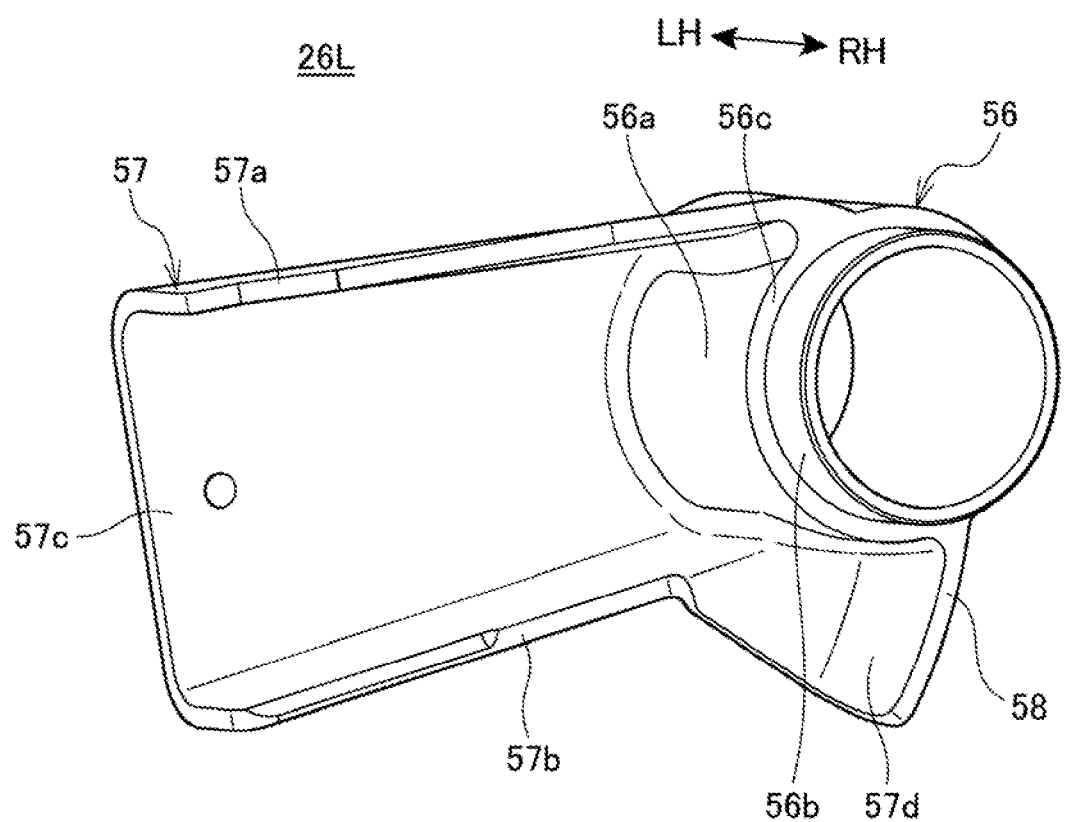
FIG. 6 is a perspective view of a left-side pivot member, as viewed from an inner side in a transverse direction of the vehicle.

FIG. 6 is a perspective view of the left-side pivot member 26L, as viewed from an inner side in a transverse direction of the vehicle.

Referring to FIGS. 2, 3 and 6, the pivot member 26L integrally includes a cylindrical pivot tube section 56 extending in the transverse direction of the vehicle, and a mounting section 57 extending rearward from the pivot tube section 56.

The material constituting the pivot member 26L is a metallic material, different from the material of the swing arm main body 25. In the present embodiment, the pivot member 26L is formed from a light metal such as an aluminum alloy.

The pivot tube section 56 includes a tube main body section 56a provided with the mounting section 57, and a fitting section 56b smaller than the tube main body section 56a in outside diameter. The fitting section 56b is provided at an end portion of the pivot tube section 56 on the inner side in the transverse direction of the vehicle. An annular stepped portion 56c is provided between the fitting section 56b and the tube main body section 56a.

The mounting section 57 includes an upper wall 57a extending rearward from an upper surface of the pivot tube section 56, a lower wall 57b extending rearward from a lower surface of the pivot tube section 56, a side wall 57c vertically connecting the upper wall 57a and the lower wall 57b, and an extension wall 57d extending downward from the lower surface of the pivot tube section 56. The side wall 57c connects an outer edge of the upper wall 57a in the transverse direction of the vehicle and an outer edge of the lower wall 57b in the transverse direction of the vehicle. The extension wall 57d is connected to a front end portion of the lower wall 57b.

An inner end surface of a front end portion of the upper wall 57a in the transverse direction of the vehicle, the stepped portion 56c, and an inner end surface of the extension wall 57d in the transverse direction of the vehicle constitute a flush connection surface 58. The connection surface 58 extends rectilinearly in the direction substantially orthogonal to the pivot shaft 17 (FIG. 1).

Referring to FIGS. 2 and 3, the pivot member 26L includes a chain slider mounting section 59 to which the chain slider 29 is mounted.

The chain slider mounting section 59 includes an engagement projection 59a provided at a front surface of the pivot tube section 56, and a fixation section 59b provided at the side wall 57c of the mounting section 57. A chain slider fixture 59c is fastened to the fixation section 59b from an outer side in the transverse direction of the vehicle. Here, the chain slider fixture 59c is a bolt.

Figure 7:
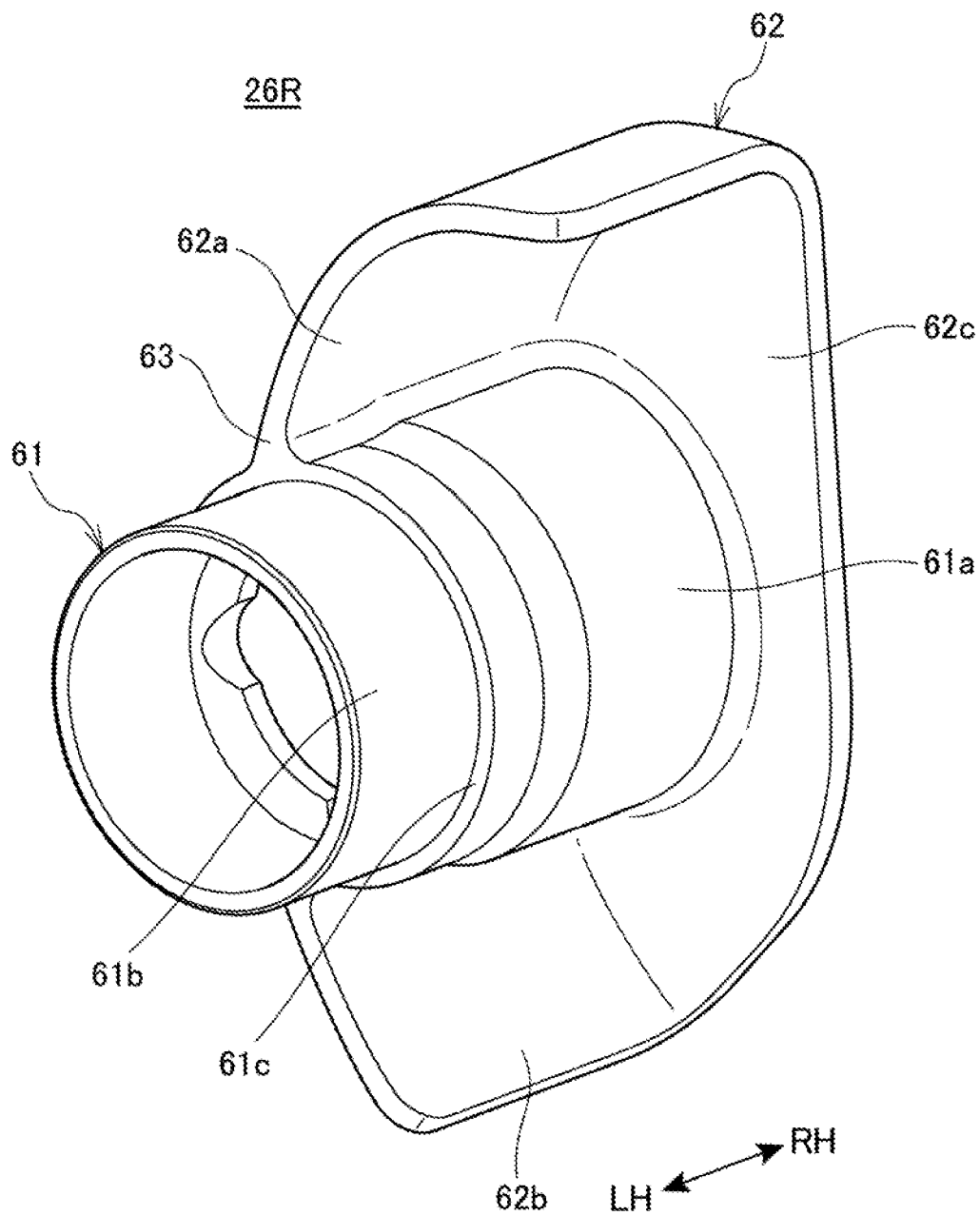
FIG. 7 is a perspective view of a right-side pivot member, as viewed from the inner side in the transverse direction of the vehicle.

FIG. 7 is a perspective view of the right-side pivot member 26R, as viewed from the inner side in the transverse direction of the vehicle.

The pivot member 26R integrally includes a cylindrical pivot tube section 61 extending in the transverse direction of the vehicle, and a mounting section 62 extending rearward from the pivot tube section 61.

The material constituting the pivot member 26R is a metallic material, different from the material of the swing arm main body 25. In the present embodiment, the pivot member 26R is formed from a light metal such as an aluminum alloy.

The pivot tube section 61 includes a tube main body section 61a provided with the mounting section 62, and a fitting section 61b smaller than the tube main body section 61a in outside diameter. The fitting section 61b is provided at an end portion of the pivot tube section 61 on an inner side in the transverse direction of the vehicle. An annular stepped portion 61c is provided between the fitting section 61b and the tube main body section 61a.

The mounting section 62 includes an upper wall 62a extending rearwardly upward from an upper surface of the pivot tube section 61, a lower wall 62b extending rearwardly downward from a lower surface of the pivot tube section 61, and a side wall 62c. The side wall 62c extends upward from an outer peripheral portion of an outer end of the pivot tube section 61 in the transverse direction of the vehicle, to be connected to the upper wall 62a, and extends downward from an outer peripheral portion of an end of the pivot tube section 61 in the transverse direction of the vehicle, to be connected to the lower wall 62b.

An inner end surface of the upper wall 62a in the transverse direction of the vehicle, the stepped portion 61c, and an inner end surface of the lower wall 62b in the transverse direction of the vehicle constitute a flush connection surface 63. The connection surface 63 extends rectilinearly in the direction substantially orthogonal to the pivot shaft 17 (FIG. 1).

Figure 8:
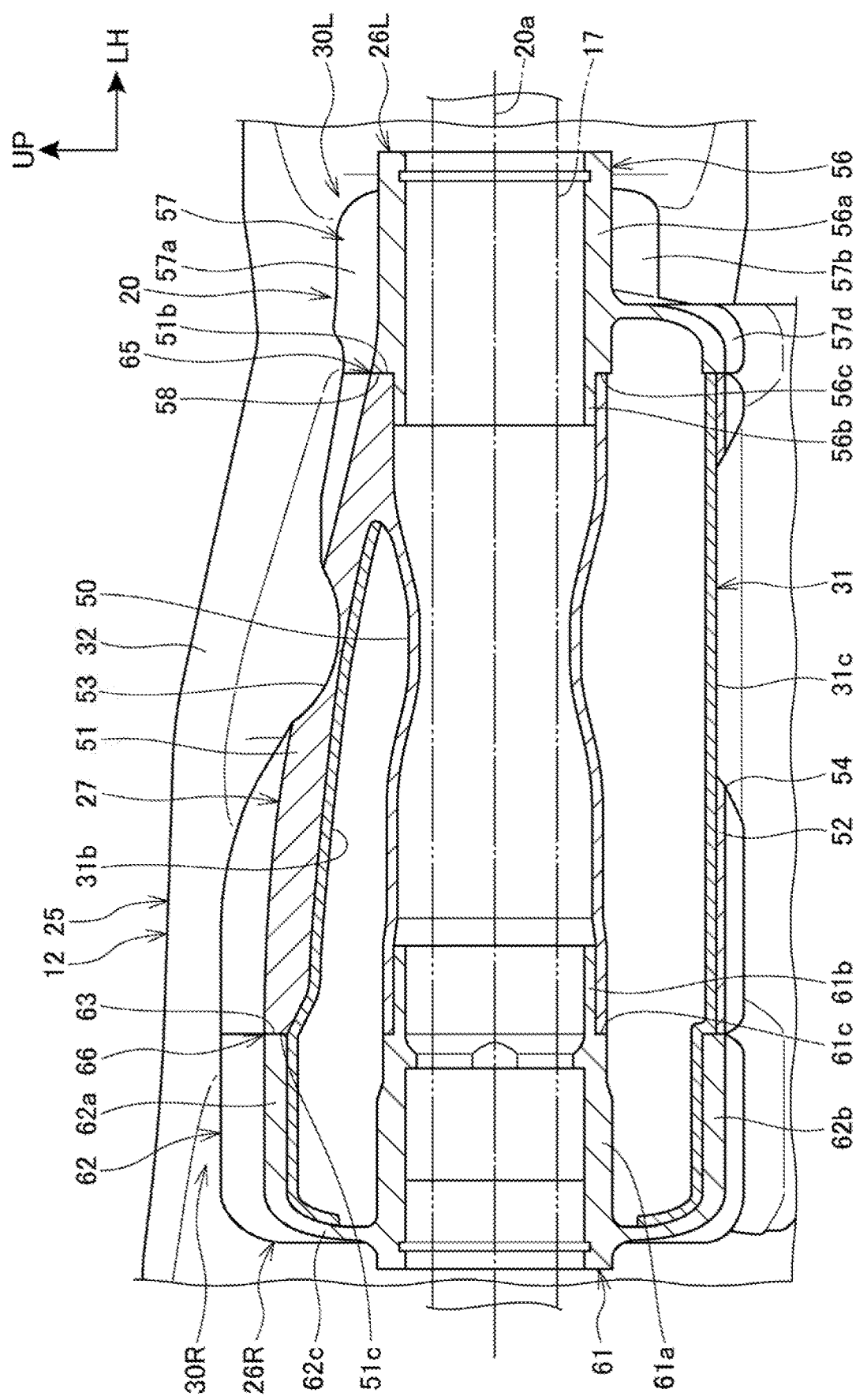
FIG. 8 is a sectional view taken along line VIII-VIII of FIG. 2.

FIG. 8 is a sectional view taken along line VIII-VIII of FIG. 2.

Referring to FIGS. 2 to 8, the pivot section 20 includes the center member 27 and the pivot members 26L and 26R. An axis 20a of rotation of the pivot section 20 coincides with an axis of the pivot shaft 17.

The left-side pivot member 26L is connected to a front end portion of the one-side arm section 30L and the center member 27.

More specifically, the pivot member 26L has the mounting section 57 put on the front end portion of the one-side arm section 30L from an outer side, and is adhered to the front end portion of the one-side arm section 30L with an adhesive which is provided on an inner surface of the mounting section 57.

Further, the pivot member 26L has the fitting section 56b of the pivot tube section 56 fitted to an inner peripheral portion of the tubular section 50 of the center member 27, and the connection surface 58 is adhered to the end face 51b of the center member 27 in the transverse direction of the vehicle with an adhesive. A contact surface 65 (joint surface) where the connection surface 58 and the end face 51b are mated is a surface substantially perpendicular to the axis 20a of the pivot section 20. Therefore, the pivot member 26L and the center member 27 can be abutted on each other in an axial direction of the pivot shaft 17 and be joined to each other at the contact surface 65, and the pivot member 26L and the center member 27 can be joined to each other easily and firmly. In addition, since the fitting section 56b of the pivot tube section 56 is fitted to an inner peripheral portion of the tubular section 50 of the center member 27, the pivot tube section 56 can be highly accurately positioned relative to the tubular section 50.

The pivot tube section 56 is located inside the front end opening 33 of the one-side arm section 30L. The front end opening 33 is closed with the pivot member 26L from the front side.

The right-side pivot member 26R is connected to a front end portion of the other-side arm section 30R and the center member 27.

More specifically, the pivot member 26R has the mounting section 62 put on the front end portion of the other-side arm section 30R from an outer side, and is adhered to the front end portion of the other-side arm section 30R with an adhesive which is provided on an inner surface of the mounting section 62.

Further, the pivot member 26R has the fitting section 61b of the pivot tube section 61 fitted to an inner peripheral portion of the tubular section 50 of the center member 27, and the connection surface 63 is adhered to the end face 51c of the center member 27 in the transverse direction of the vehicle with an adhesive. A contact surface 66 (joint surface) where the connection surface 63 and the end face 51c are mated is a surface substantially perpendicular to the axis 20a of the pivot section 20. Therefore, the pivot member 26R and the center member 27 can be abutted on each other in the axial direction of the pivot shaft 17 and be joined to each other at the contact surface 66, and the pivot member 26R and the center member 27 can be joined to each other easily and firmly. In addition, since the fitting section 61b of the pivot tube section 61 is fitted to an inner peripheral portion of the tubular section 50 of the center member 27, the pivot tube section 61 can be highly accurately positioned relative to the tubular section 50.

The pivot tube section 61 is located inside the front end opening 37 of the other-side arm section 30R. The front end opening 37 is closed with the pivot member 26R from the front side.

Specifically, the pivot-side opening 40 of the swing arm main body 25 is closed with the pivot members 26L and 26R and the center member 27 from the front side.

The pivot shaft 17 is inserted in and passed through the pivot tube section 56, the tubular section 50 and the pivot tube section 61 which are disposed coaxially.

The pivot shaft 17 is supported by the pivot members 26L and 26R through bearings (not depicted) provided at an inner peripheral portion of the pivot tube section 56 and an inner peripheral portion of the pivot tube section 61.

As illustrated in FIG. 2, the chain slider 29 includes: an upper-side guide section 29a provided along an upper surface of the one-side arm section 30L; a lower-side guide section 29b extending on the lower side of the upper-side guide section 29a from the pivot member 26L side to the chain passing hole 36 side; a connection section 29c connecting a front end of the upper-side guide section 29a and a front end of the lower-side guide section 29b; and a vertical connection section 29d vertically connecting the upper-side guide section 29a and the lower-side guide section 29b on the rear side of the connection section 29c.

The connection section 29c is provided with an engagement hole 29e with which the engagement projection 59a of the pivot member 26L is engaged from the rear side. The chain slider fixture 59c is inserted in and passed through a vertically intermediate portion of the vertical connection section 29d from an outer side in the transverse direction of the vehicle.

A front portion of the chain slider 29 is fixed to the pivot member 26L, through engagement of the engagement hole 29e with the engagement projection 59a and through fastening of the vertical connection section 29d to the fixation section 59b by the chain slider fixture 59c. Thus, the metal-made pivot member 26L is provided with the engagement projection 59a and the fixation section 59b, and, therefore, the chain slider 29 can be fixed without providing the fiber reinforced resin-made swing arm main body 25 with a fixation section for a front portion of the chain slider 29. Accordingly, the swing arm main body 25 can be simplified in shape.

As illustrated in FIGS. 2 and 3, the wheel support section 21 is configured by connection of the end pieces 28L and 28R to a rear end portion of the one-side arm section 30L and a rear end portion of the other-side arm section 30R.

The end pieces 28L and 28R are formed in a substantially rectangular plate shape. The end pieces 28L and 28R are provided with axle passing holes 28a, 28a penetrating in the transverse direction of the vehicle. The axle 18 is inserted in and passed through the axle passing holes 28a, 28a and is supported by the end pieces 28L and 28R.

The material constituting the end pieces 28L and 28R is a metallic material, different from the material of the swing arm main body 25. In the present embodiment, the end pieces 28L and 28R are formed from a light metal such as an aluminum alloy.

The end pieces 28L and 28R are inserted respectively into the rear end opening 34 and the rear end opening 38 from the rear side, and are adhered to rear end portions of the one-side arm section 30L and the other-side arm section 30R with an adhesive.

Here, an example of steps of manufacturing the swing arm 12 will be described.

The swing arm main body 25, the pivot members 26L and 26R, the center member 27, and the end pieces 28L and 28R are manufactured individually.

The swing arm main body 25 is formed in a product shape by a process in which a fiber reinforced resin as a material is set in a mold for molding, and a balloon-like tube disposed in a hollow portion of the swing arm main body 25 is inflated by air pressure or the like, whereby the fiber reinforced resin is pressed against the inner surface of the mold by the tube.

Thereafter, the pivot members 26L and 26R, the center member 27, and the end pieces 28L and 28R are adhered to the swing arm main body 25.

In the present embodiment, the swing arm main body 25 includes the pivot-side opening 40 and the rear end openings 34 and 38 as wheel-side openings, and is formed in a hollow shape which is continuous from the pivot-side opening 40 to the rear end openings 34 and 38. This enables the above-mentioned tube for molding to penetrate from the pivot-side opening 40 to the rear end openings 34 and 38. Therefore, the swing arm main body 25 can be easily molded, and the degree of freedom about the shape of the swing arm main body 25 can be enhanced. For example, in the case of forming a hollow swing arm main body by joining an upper half and a lower half, divided into upper and lower portions, to each other at a mating surface, the fiber reinforced resin is separated at the mating surface. On the other hand, in the swing arm main body 25 in the present embodiment, the swing arm main body 25 is formed into a hollow shape by applying a pressure from inside, and, therefore, the continuity of fibers of the fiber reinforced resin can be maintained over a wide range, and the strength and rigidity of the swing arm main body 25 can be enhanced.

In addition, a plurality of the above-mentioned tubes which are independent can be passed into the swing arm main body 25 from the rear end openings 34 and 38, so that the degree of freedom in molding the swing arm main body 25 is high.

Besides, after the molding of the swing arm main body 25, the pivot-side opening 40 is closed with the pivot members 26L and 26R and the center member 27, whereas the rear end openings 34 and 38 are closed with the end pieces 28L and 28R. For this reason, foreign matter such as small stones can be prevented from entering into the swing arm main body 25.

As has been described above, according to the embodiment of the present invention, the swing arm 12 of the motorcycle 1 includes the pivot section 20 connected to the body frame F, and the wheel support section 21 that supports the rear wheel 3. The swing arm 12 can swing with the pivot section 20 as a center, and has the swing arm main body 25 made of a fiber reinforced resin. The swing arm main body 25 includes the pivot-side opening 40 for opening the end on the pivot section 20 side, and the rear end openings 34 and 38 for opening the ends on the wheel support section 21 side, and is formed in a hollow shape which is continuous from the pivot-side opening 40 to the rear end openings 34 and 38.

This configuration ensures that since the swing arm main body 25 is in a hollow shape that is continuous from the pivot-side opening 40 to the rear end openings 34 and 38, a pressure can be exerted from the inside of the fiber reinforced resin-made swing arm main body 25, and the swing arm main body 25 can be molded to be hollow by this pressure. Therefore, the continuity of fibers of the fiber reinforced resin can be maintained over a wide range of the swing arm main body 25, and a hollow swing arm 12 high in rigidity can be provided.

In addition, the pivot section 20 includes the pair of metal-made pivot members 26L and 26R provided on the left and right sides of the swing arm main body 25, and the fiber reinforced resin-made center member 27 interposed between the left and right pivot members 26L and 26R. This enables the pivot section 20 to be lighter in weight due to the fiber reinforced resin-made center member 27. Besides, the pivot members 26L and 26R can be positioned by the center member 27 interposed between the left and right pivot members 26L and 26R.

In addition, the contact surfaces 65 and 66 between the pivot members 26L and 26R and the center member 27 are surfaces perpendicular to the axis 20a of the pivot section 20. This configuration enables the pivot members 26L and 26R to be highly accurately positioned by abutting the pivot members 26L and 26R straight on the center member 27. The contact surfaces 65 and 66 are rectilinear extending straight in the longitudinal vehicle direction, as the swing arm is viewed from the front side.

Further, the center member 27 is laid on and joined to the swing arm main body 25, the upper edge 51a as an outer edge of the center member 27 includes the upper-side recess 53 in a central portion in the transverse direction of the vehicle, and the lower edge 52a as an outer edge of the center member 27 includes the lower-side recess 54 in a central portion in the transverse direction of the vehicle. According to this configuration, stresses from the sides of the pivot members 26L and 26R can be appropriately received by both end faces 51b and 51c of the center member 27 in the transverse direction of the vehicle, and the volume of the center member 27 can be reduced by providing the upper-side recess 53 and the lower-side recess 54 in the central portion of the outer edge of the center member 27 in the transverse direction of the vehicle. Therefore, the center member 27 can be lightened in weight.

Besides, the pivot members 26L and 26R are provided with the chain slider mounting section 59 to which the chain slider 29 is mounted. This configuration ensures that since the metal-made pivot members 26L and 26R are provided with the chain slider mounting section 59, it is unnecessary to break the continuity of fibers of the fiber reinforced resin for the purpose of providing the chain slider mounting section 59. Therefore, the rigidity of the swing arm 12 can be enhanced.

In addition, the pivot members 26L and 26R and the center member 27 close the pivot-side opening 40. This configuration enables the pivot-side opening 40 to be closed with a simple structure.

Note that the above embodiment represents a mode of application of the present invention, and the present invention is not limited to the above embodiment.

While the pivot section 20 of the swing arm 12 of the motorcycle 1 has been described to be connected to the body frame F as a vehicle body in the above embodiment, this is not limitative. For example, the pivot section 20 may be connected to the engine as a vehicle body by the pivot shaft.

While description has been made by taking the motorcycle 1 as an example of the saddle riding vehicle in the above embodiment, this is not restrictive of the present invention. The swing arm 12 of the present invention is applicable to saddle riding vehicles such as three-wheeled saddle riding vehicles having two front wheels or two rear wheels, and saddle riding vehicles having four or more wheels.

DESCRIPTION OF REFERENCE SYMBOLS

1 Motorcycle (saddle riding vehicle)
Rear wheel (wheel)
12 Swing arm
20 Pivot section
20a Axis
21 Wheel support section
25 Swing arm main body
26L, 26R Pivot member
27 Center member
29 Chain slider
34 Rear end opening (Wheel-side opening)
38 Rear end opening (Wheel-side opening)
40 Pivot-side opening
51a Upper edge (Outer edge)
52a Lower edge (Outer edge)
53 Upper-side recess (Recess)
54 Lower-side recess (Recess)
59 Chain slider mounting section
65 Contact surface
66 Contact surface
F Body frame (Vehicle body)

The invention claimed is:
1. A swing arm for a saddle riding vehicle which includes a pivot section connected to a vehicle body, and a wheel support section configured to support a wheel, and which is capable of swinging around the pivot section, the swing arm comprising:
 a swing arm main body made of a fiber reinforced resin, wherein the swing arm main body includes a pivot-side opening configured to open an end on a side of the pivot section, and a wheel-side opening configured to open an end on a side of the wheel support section, and is formed in a hollow shape continuous from the pivot-side opening to the wheel-side opening,
 the swing arm main body includes: a one-side arm section located on one of left and right sides of the wheel: an other-side arm section located on the other of the left and right sides of the wheel: a connection section connecting the one-side arm section and the other-side arm section in a left-right direction, the pivot-side opening continuously includes a one-side opening provided to the one-side arm section, an other-side opening provided to the other-side arm section, and a connection section opening provided to the connection section, the pivot section includes: a one-side pivot member which is located on one of left and right sides of the swing arm main body and which is made of metal; an other-side pivot member which is located on the other of the left and right sides of the swing arm main body and which is made of metal; and a center member which is interposed between the one-side pivot member and the other-side pivot member and which is made of a fiber reinforced resin, the one-side opening is closed with the one-side pivot member, the other-side opening is closed with the other-side pivot member, the connection section opening is closed with the center member, whereby the pivot-side opening is entirely closed.

2. The swing arm for the saddle riding vehicle according to claim 1, wherein contact surfaces between the pivot members and the center member are surfaces perpendicular to an axis of the pivot section.

3. The swing arm for the saddle riding vehicle according to claim 1, wherein the center member is laid on and joined to the swing arm main body, and an outer edge of the center member is provided with a recess in a central portion in a transverse direction of the vehicle.

4. The swing arm for the saddle riding vehicle according to claim 1, wherein the pivot members are provided with a chain slider mounting section to which a chain slider is mounted.

* * * * *